(12) United States Patent
Moberg

(10) Patent No.: US 11,613,027 B2
(45) Date of Patent: Mar. 28, 2023

(54) COMPRESSIBLE SECTIONING SUCTION CUP LIP AND SUCTION CUP COMPRISING THE LIP

(71) Applicant: PIAB Aktiebolag, Täby (SE)

(72) Inventor: Johan Moberg, Täby (SE)

(73) Assignee: PIAB Aktiebolag, Täby (SE)

( * ) Notice: Subject to any disclaimer, the term of this patent is extended or adjusted under 35 U.S.C. 154(b) by 61 days.

(21) Appl. No.: 16/952,221

(22) Filed: Nov. 19, 2020

(65) Prior Publication Data

US 2021/0187756 A1 Jun. 24, 2021

(30) Foreign Application Priority Data

Dec. 20, 2019 (EP) ..................................... 19219101

(51) Int. Cl.
*B25J 15/06* (2006.01)

(52) U.S. Cl.
CPC ................. *B25J 15/0683* (2013.01)

(58) Field of Classification Search
CPC .................................................. B25J 15/0683
See application file for complete search history.

(56) References Cited

U.S. PATENT DOCUMENTS

| 9,682,485 B2 | 6/2017 | Moore |
| 2002/0011735 A1 | 1/2002 | Nagai |
| 2002/0185575 A1 | 12/2002 | Kalb |
| 2010/0267317 A1* | 10/2010 | Takahashi .............. B23Q 3/088 451/388 |
| 2014/0161582 A1* | 6/2014 | Maffeis ................ B25J 15/0683 414/800 |
| 2019/0022874 A1* | 1/2019 | Mutch ................... B25J 15/0675 |
| 2020/0047352 A1 | 2/2020 | Nakayama et al. |

FOREIGN PATENT DOCUMENTS

| CN | 108724234 A | 11/2018 |
| EP | 3133035 A1 | 2/2017 |
| FR | 2547289 A3 * | 12/1984 |
| JP | 404022440 U | 2/1992 |
| JP | 08188277 A * | 7/1996 |
| JP | H08188277 | 7/1996 |
| JP | 2016092239 A * | 5/2016 |
| JP | 2016092239 A | 5/2016 |
| WO | 2010110719 A1 | 9/2010 |
| WO | WO-2010110719 A1 * | 9/2010 .......... B25J 15/0616 |

OTHER PUBLICATIONS

Extended European Search Report dated Jul. 7, 2020, for European Priority Application No. 19219101.3.

* cited by examiner

*Primary Examiner* — Gerald McClain
(74) *Attorney, Agent, or Firm* — Renner, Otto, Boisselle & Sklar, LLP

(57) ABSTRACT

A compressible lip for a suction cup has in its engagement area one or more sectional areas, each of which comprises a flow passage capable of forming a flow restriction together with a surface of an object to be engaged by the lip. The flow restriction formed restricts airflow from the sectional area, thus allowing a suction cup provided with such lip to maintain an overall high vacuum level despite of pressure loss in one, or some, of its sectional areas. A suction cup having such compressible lip is also disclosed.

15 Claims, 5 Drawing Sheets

COMPRESSIBLE SECTIONING SUCTION CUP LIP AND SUCTION CUP COMPRISING THE LIP

This application claims priority of European Patent Application No. 19219101.3 filed Dec. 20, 2019, which is hereby incorporated herein by reference.

FIELD OF THE INVENTION

The present invention generally relates to suction cups, and more particularly to a compressible lip for a suction cup having in its engagement area one or more sectional areas, wherein each sectional area is provided with a flow passage capable of forming, together with a surface of an object to be engaged by the lip, a flow restriction, for restricting airflow from the sectional area. The flow restriction formed by the lip with the surface of the object enables a suction cup provided with such lip to maintain an overall high vacuum level despite of pressure loss in one, or some, of its one or more sectional areas. The invention also relates to a suction cup having such lip.

BACKGROUND ART

Suction cups are frequently used in automated industry for engaging and lifting various objects, such as e.g. packages, boxes, bags, sheet steel, flat glass, automotive parts, by means of using a reduced pressure in the suction cup. A suction cup may also be referred to as a vacuum pad. The objects to be engaged and lifted often varies in shape, size, material, and weight. Suction cups are frequently used in lifting operations involving heavy goods. When positioned over a hole in an object to be lifted, such as a package, box, bag, a piece of sheet steel, or flat glass, or an automotive part, through which hole ambient air can flow from outside the object, vacuum may not form in the suction cup, or only an insufficient degree of vacuum is formed in the suction cup. Likewise, when placed over an edge of an object, i.e. so that part of the suction cup is outside the engagement surface of the object, a sufficient degree of vacuum is highly unlikely to be formed in the suction cup thus placed.

It is difficult to lift objects exhibiting holes, or to lift objects when the suction cup overlaps an edge of the object. In these cases, the high leakage flow makes it difficult to create a sufficient vacuum level inside the cup, often resulting in a failed pick.

U.S. Pat. No. 9,682,485 B2 teaches a suction cup having multiple concentric sealing areas when engaging an object to be handled.

A double lip flat cup is commercially available on the market, such as provided by Parker Pneumatic of Parker Hannifin Corporation, having dual concentric sealing lips which provide for two seals for vacuum, under the trade designation P5V-CFS Double Lip Flat Cups. As an object to be lifted flexes, the outer lip seal may break, but the inner lip seal will hold the degree of vacuum for continued lifting capacity.

It would be desirable to provide a suction cup which could be placed over a hole in an object to be lifted, or over an edge of an object to be lifted, while allowing for creating and holding a sufficient degree of vacuum for engagement and lifting capacity.

SUMMARY OF THE INVENTION

According to the present invention, for a conventional compressible lip of the preamble of claim 1 for a suction cup, wherein the lip in an upper portion thereof has a central opening 50 to vacuum, and the lip extends outwardly to a sealing portion 35 located in a lower portion of the lip defining an engagement area "A" of the lip for engaging an object 100 to be lifted, the above object has been achieved by means of the distinguishing features as set forth in the characterizing portion of claim 1, according to which the lip exhibits a raised portion 60 running along a sectional area "a", "b", "c", "d", "e", "f", wherein said raised portion exhibits a flow passage 70 to vacuum from the central opening, and wherein the sectional area is defined by the raised portion, or by the raised portion and part of the sealing portion, and wherein the flow passage is formed in the raised portion, wherein the flow passage is capable of forming, together with a surface 105 of the object, a flow restriction 75 when the raised portion containing the flow passage is brought into contact with said surface of the object by compression of the lip.

Accordingly, in one aspect the invention relates to such compressible lip 30.

In another aspect, the invention relates to a suction cup 10 exhibiting the inventive compressible lip 30, which cup comprises: a hollow mounting portion 15 having an upper end and a lower end; a hollow body portion 25 having an upper end and a lower end; and, a lip 30 having in an upper portion thereof a central opening 50 to vacuum, wherein the hollow body portion in its lower end is sealingly connected to the lip, said lip extending outwardly from the hollow body portion to a sealing portion 35 located in a lower portion of the lip defining an engagement area "A" of the suction cup for engaging and lifting the object, wherein the upper end of the hollow mounting portion is provided with an opening 20 adapted to be connected to a vacuum source, and the lower end of the hollow mounting portion is sealingly connected to the upper end of the hollow body portion, which suction cup is distinguished by the technical features as set forth in the characterizing portion of claim 9, according to which the lip exhibits a raised portion 60 running along a sectional area "a", "b", "c", "d", "e", "f" of the engagement area "A", said raised portion having a flow passage 70 to vacuum from the central opening, wherein the sectional area is defined by the raised portion, or by the raised portion and part of the sealing portion, and wherein the flow passage is formed in the raised portion, wherein the flow passage is capable of forming, together with a surface 105 of the object, a flow restriction 75 when the raised portion containing the flow passage is brought into contact with said surface of the object by compression of the lip.

According to one embodiment of the invention, the raised portion defines a sectional area "a", as e.g. shown in FIG. 1. Upon contact of the raised portion containing a flow passage 70 the flow passage, together with a surface 105 of an object 100 to be lifted, will form a flow restriction 75, through which restriction airflow from the sectional area "a" is limited.

According to another embodiment of the invention a sectional area "a" is defined by the raised portion together with part of the sealing portion of the lip, such as e.g. shown in FIG. 2.

In yet another embodiment, an inner raised portion 60a, provided on an inner portion of the lip and running along the central opening of the lip, exhibits one flow passage 70 for each sectional area such as e.g. shown in FIG. 3.

In one embodiment, radial raised portions 60b run from the inner raised portion 60a to the sealing portion of the lip. In a preferred embodiment six radial raised portions are provided providing six sectional areas "a", "b", "c", "d", "e", "f", such as e.g. shown in FIG. 3.

The compressible lip of the inventive suction cup exhibits one or more sectional areas. Upon actuation of the suction cup, as the lip is being compressed towards a surface of an object to be engaged, the raised portion 60 containing the flow passage 70 will be brought into contact with the surface. Upon contact of the raised portion containing the flow passage with the surface, the flow passage will form a flow restriction 75 with the surface. With the exception for a flow passage leading into the sectional area, each sectional area by means of the raised portion, or, by means of a combination of the raised portion and a part of the sealing portion defining the sectional area, seals individually against a surface of an object to be engaged upon actuation of the suction cup as described above. Each sectional area is airflow restricted. Accordingly, only a certain limited amount of air can flow through each sectional area. If the inventive cup encounters high leakage in one of its sectional areas, the flow restriction formed by the flow passage together with the underlying surface of the object will restrict the flow from such sectional area, and the remaining sectional areas are able to maintain a high vacuum level.

The provision of flow restricted sectional areas allows the inventive suction cup to be a viable option for lifting objects with holes or bends. It also enables the picking of randomly placed objects on a conveyer belt where the cup lip may overlap the object edge. For such applications it is preferred that the engagement area A of the lip is fully divided into sectional areas.

According to the invention, the engagement area of the lip is partly or fully divided into sectional areas. The inventive sectional area which is capable of being flow restricted upon actuation is also referred to as a flow restricted sectional area.

The provision of a flow passage leading in to each sectional area limits the airflow from each such sectional area when the suction cup is engaging an object, thus allowing the suction cup to maintain an overall high vacuum level despite of pressure loss in some of its sectional areas.

The term "cup", as used in suction cup, is not intended to restrict the geometrical shape of the engagement surface of the cup, and is intended to embrace engagement surfaces which are not only circular, but also square, rectangular, oval etc.

The term "flow passage" is intended to refer to a passage which, upon actuation of the suction cup, so that the raised portion containing such flow passage is brought into contact with the surface of the object, is effective for allowing air to flow from a sectional area to the central opening to which a source of vacuum is connected, so that a reduced pressure in the sectional area can be obtained, and, which passage, when a portion of the sectional area containing the passage is exposed to ambient air while vacuum is applied to the suction cup, is effective for restricting the flow of ambient air from the partly exposed sectional area in to the central opening of the suction cup.

The term "upper", e.g. as used herein in upper portion, is intended to refer to a position more distal to an object to be engaged.

The term "lower", e.g. as used herein in lower portion, is intended to refer to a position closer to an object to be engaged.

The term "compressible" as used herein is intended to refer to the ability of a lip, from a relaxed state of the lip wherein, at the most, only a peripheral part of the raised portion is in contact with an underlying surface of an object to be engaged by the lip, to collapse against the surface into a state such that the raised portion of the lip is fully in contact with the surface.

The term "sectional area" as used herein is intended to refer to a part of the total engagement area of a lip, said sectional area being defined by a raised portion, or by a combination of a raised portion and a part of the sealing portion of the lip. The raised portion defining a sectional area, by itself or together with a part of the sealing portion of the lip, must be continuous, with exception for at least one flow passage being provided in the raised portion.

Further embodiments and advantages of the invention will be apparent from the detailed description and appended claims.

BRIEF DESCRIPTION OF THE ATTACHED DRAWINGS

Figure 1:
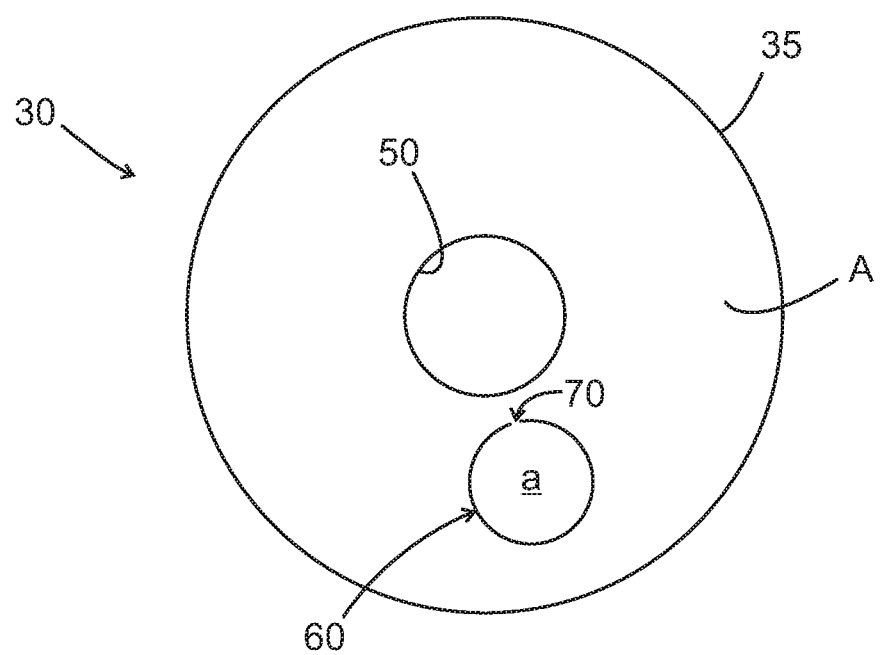
FIG. 1 shows an embodiment of the compressible lip 30 having an engagement area "A" and a sectional area "a".
Figure 2:
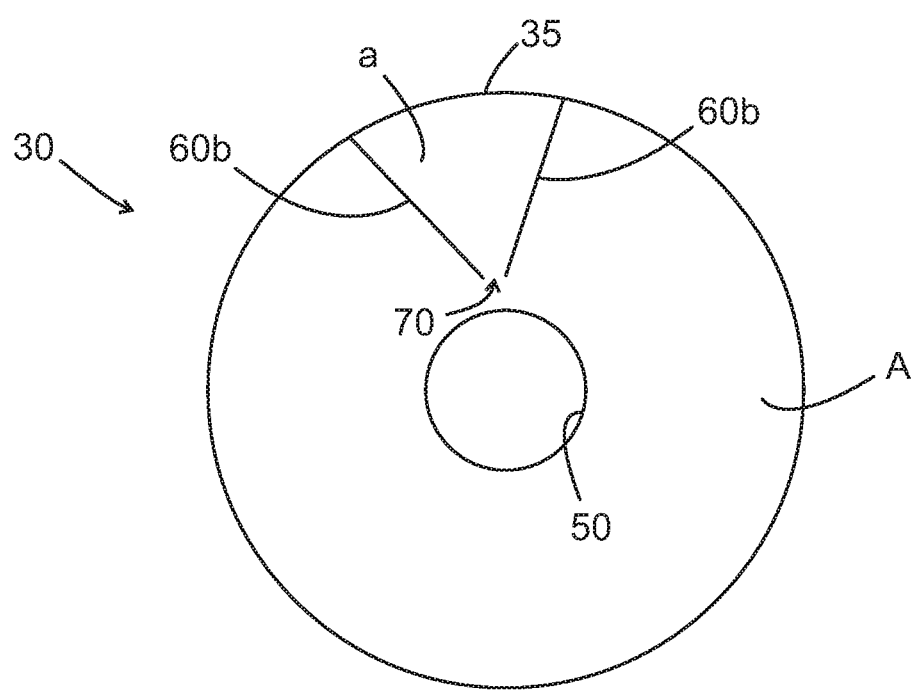
FIG. 2 shows an embodiment of the compressible lip 30 having an engagement area "A" and a sectional area "a", wherein the sectional area is defined by the raised portion and part of the sealing portion.
Figure 3:
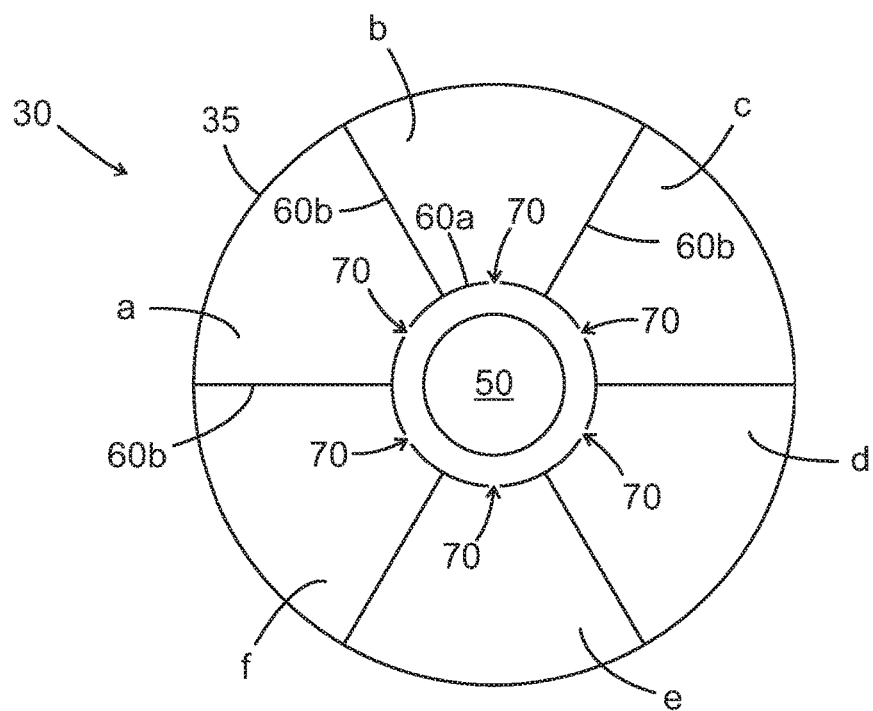
FIG. 3 shows an embodiment of the compressible lip 30, which lip has an engagement area "A", divided into six sectional areas "a", "b", "c", "d", "e", and "f".
Figure 4:
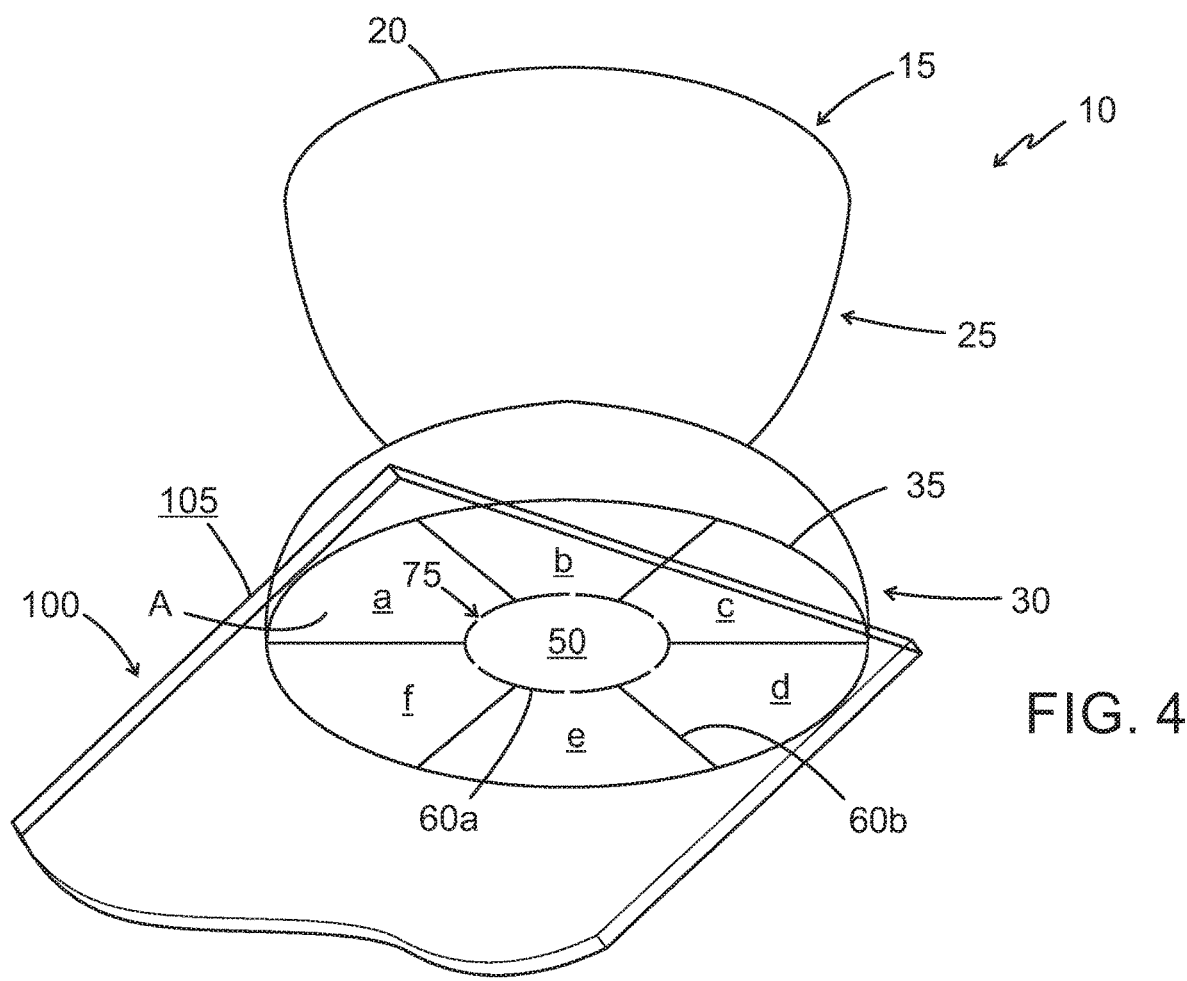

FIG. 4 shows an embodiment of a suction cup 10 having a lip 30 as shown in FIG. 3 in an actuated state. The suction cup shown is placed over a transparent acrylic sheet 100 such that two sectional areas, "b" and "c", are partly exposed to ambient atmosphere. As schematically illustrated for sectional area "a", a flow restriction 75 is formed by flow passage 70 together with surface 105 of object 100. A flow restriction 75 is also formed for each one of the remaining sectional areas, "b", "c", "d", "e", and "f".

Figure 5:
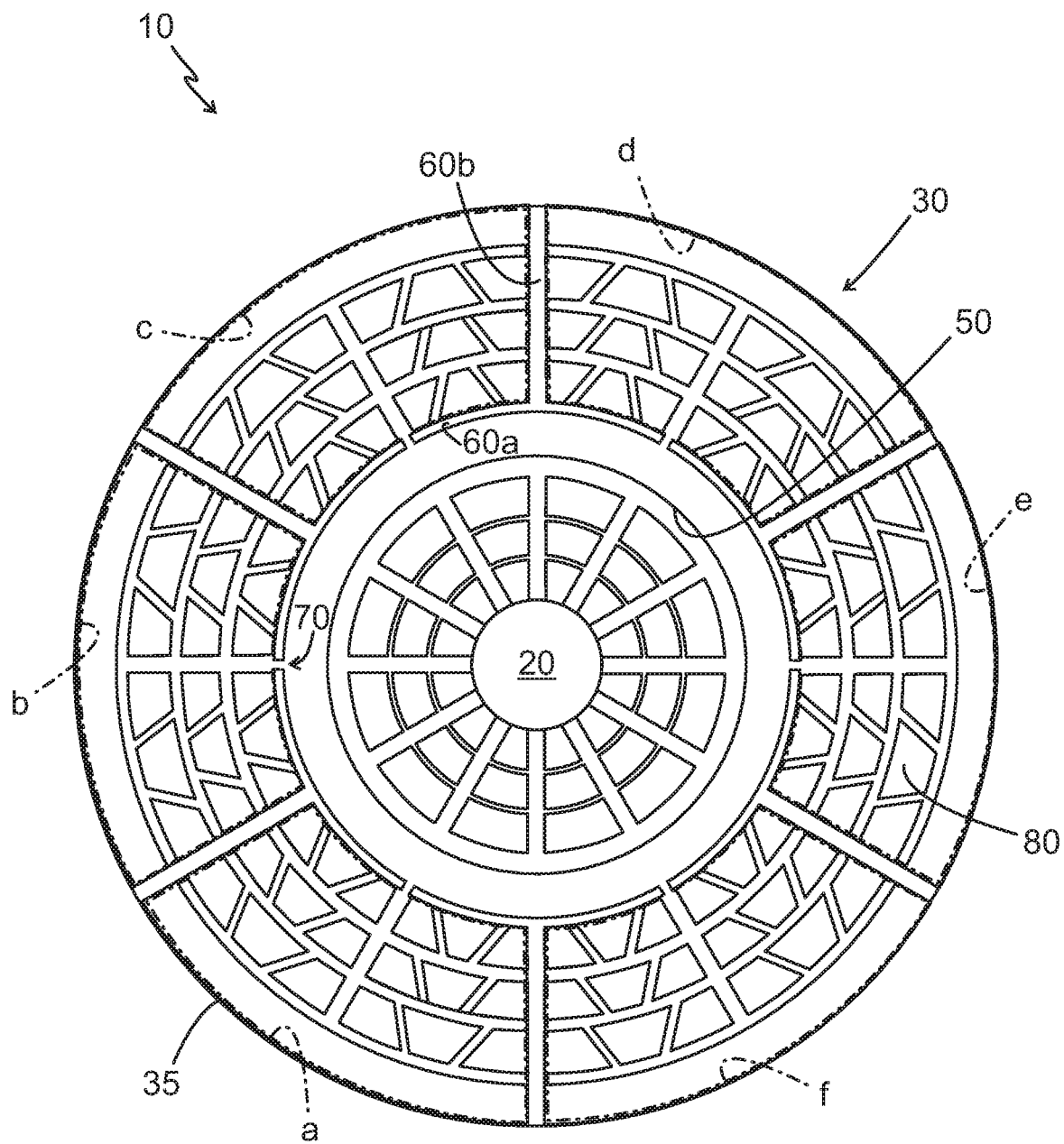

FIG. 5 is a bottom view of a suction cup 10 having a lip 30 exhibiting frictional elements 80. The respective sectional areas, "a", "b", "c", "d", "e", and "f", are indicated by broken lines, each of which is only interrupted by a flow passage 70, one flow passage for each sectional area in the embodiment shown.

Figure 6:
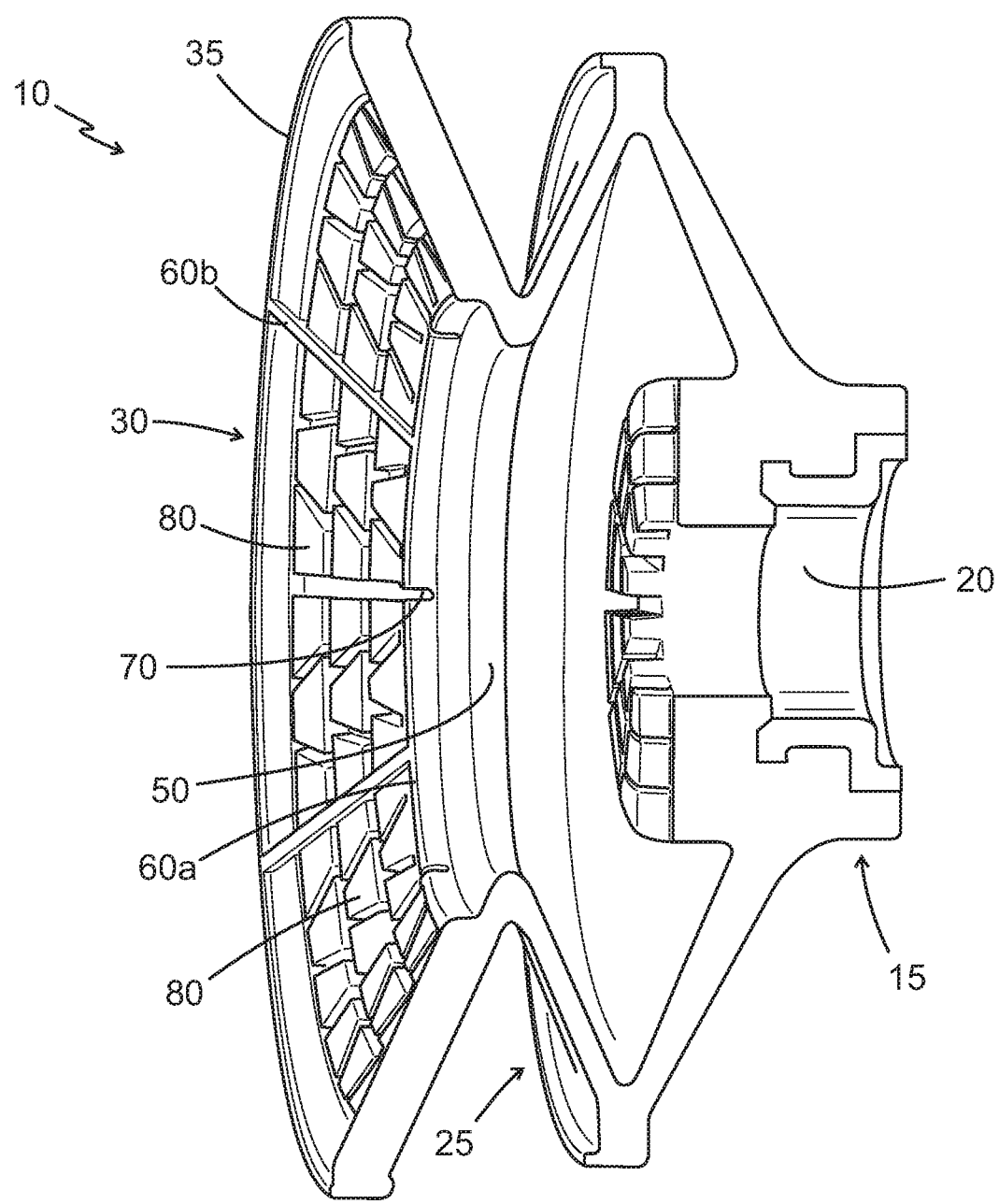

FIG. 6 shows a cross-sectional view of the suction cup of FIG. 5.

Figure 7:
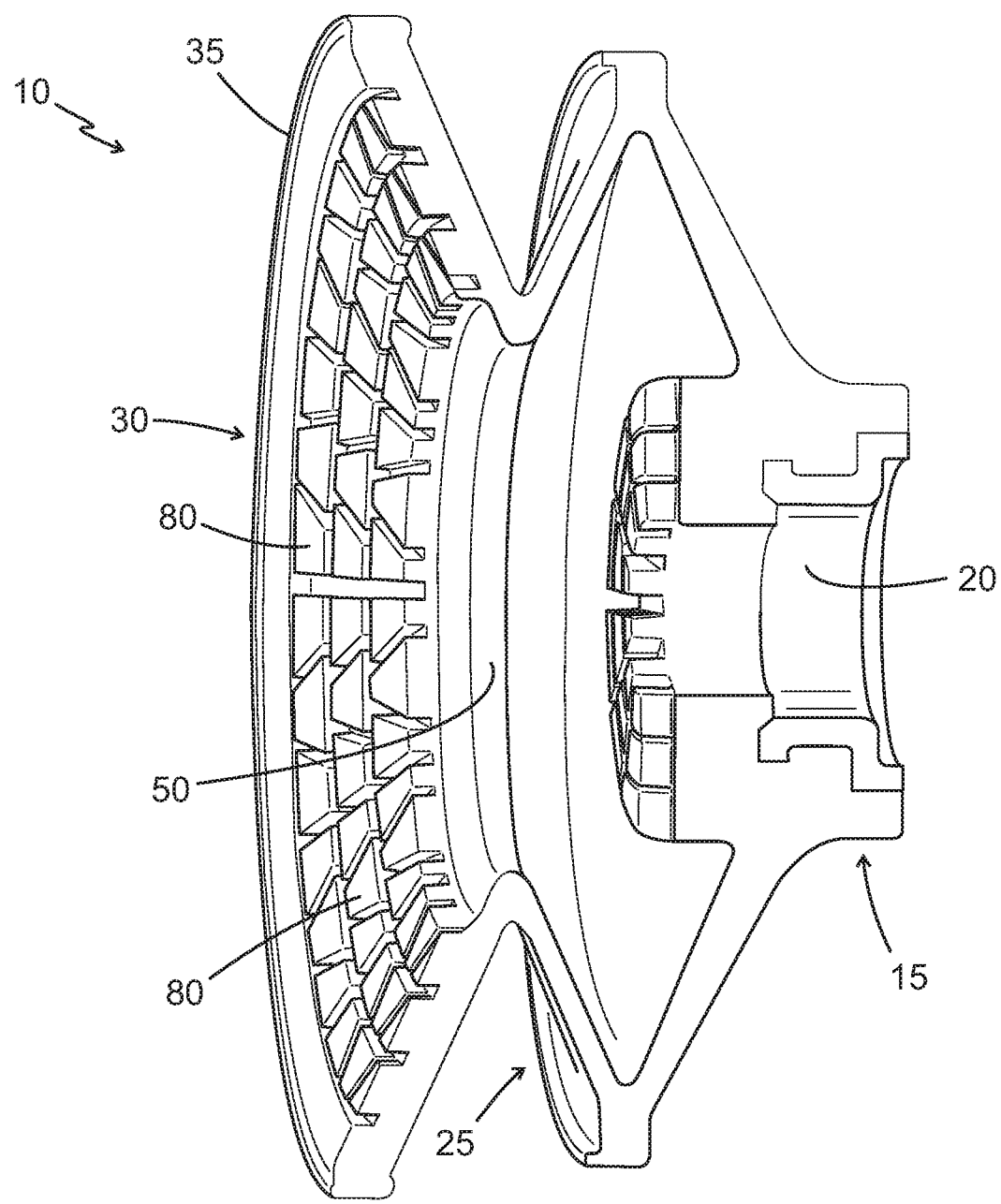

FIG. 7 shows a conventional suction cup 10, which does not exhibit an inventive sectional area.

DETAILED DESCRIPTION OF THE INVENTION

The inventive compressible lip and suction cup exhibit one or more flow restricted sectional areas. Embodiments with merely one flow restricted sectional area can be useful e.g. in instances of a known location of an obstacle on an object to be lifted, such as for example a hole, provided that the suction cup is oriented or aligned accordingly.

According to the invention, a sectional area may be defined solely by a raised portion running along the sectional area, or, by one or more raised portions and part of the sealing portion. The raised portion can e.g. take the form of a ridge, or a wall.

The inventive lip can advantageously be made in one single piece.

Upon actuation of the inventive suction cup, each sectional area seals individually against a surface of an object to be engaged, except for a flow restriction provided in such sectional area, formed by a flow passage and the underlying surface of the object. Each sectional area is fluidly connected via a flow restriction to the central opening of the suction cup, which opening is connected to a source of vacuum. Accordingly, in the actuated working state of the suction cup, a sectional area is only in fluid connection with the source of vacuum via its inventive one or more flow restrictions.

Upon actuation of a suction cup comprising the inventive lip, the suction cup is believed to be evacuated in two steps. In a first step, as the lower sealing portion of the lip of the suction cup is brought into contact with a surface of an object to be engaged, the sealing portion of the lip will seal against the surface the object, and a main volume of the suction cup over the engagement area will be quickly evacuated via the central opening to which a vacuum source is connected. During evacuation of the main volume, in the first step, the raised portion or portions will be brought in to contact with the surface of the object so as to seal against the surface (except for the flow restriction or restrictions), and, in a second step, the one or more sectional areas will be evacuated to the central opening through the one or more flow restrictions which are in fluid communication with the central opening. Accordingly, it is believed that sufficient engagement will be quickly established in a first step, and that full evacuation of the sectional area or areas will thereafter be established in a second step.

During the first step, the full performance of the vacuum source, e.g. a pump, is connected to the whole engagement area of the lip, allowing for rapid evacuation of the internal volume of the cup. Accordingly, during the first step, evacuation is not carried out using any flow restrictions, which would otherwise impede evacuation and render the response time unduly long. Thereby, the invention provides for a short response time of the suction cup. In a preferred embodiment the inventive suction cup includes a bellows.

According to the present invention, the flow restrictions are formed only upon full collapse of the lip against the surface of an object.

The flow passage of a raised portion is preferably located and configured so as to face the center of the engagement area, and so as to be at shortest possible distance from the central opening of the lip.

The sectional areas and flow passages may vary in size and geometric shape, but are characterized by the ability to maintain different degrees of vacuum when air flows through the suction cup, due to partial exposure of a sectional area to ambient air. One exposed sectional area can for example uphold a pressure similar to ambient pressure, while another non-exposed sectional area at the same time can maintain a deeper degree of vacuum. Hence, in an instance of leakage of ambient air into any individual sectional area or areas, the overall lifting power of the suction cup will not be reduced to same extent, as a conventional suction cup. In an instance of leakage of ambient air into a prior art suction cup, a low homogeneous pressure would prevail over the whole engagement surface of suction cup, and the lifting capacity of the suction cup would be severely reduced, or even fully lost.

While the size of a flow passage fulfilling the above-defined inventive purpose may vary, e.g. depending on the size of the cup, the size of the associated sectional area, the total number of sectional areas, the total number of flow passages, the size of a flow passage will typically be within the range of 0.2-4.0 $mm^2$, more typically 0.4-1.5 $mm^2$.

The geometrical shape of a flow passage is not critical, and can e.g. be square, rectangular, triangular, semi-circular, and arc-shaped.

It is preferred that a wider dimension of the flow passage is facing the surface of an object to be engaged. The more open the flow passage is at the lower portion thereof facing the surface of the object, the longer it will take until the restriction is formed, and the longer the full performance of the vacuum pump can be utilized before a restriction is formed. For this reason a rectangular, triangular, semi-circular, or arc-shaped shape of the flow passage is generally preferred.

Accordingly, while a through hole (not shown) formed in the raised portion in principle alternatively could be used as the flow passage and flow restriction, such alternative design is considered inferior as it would not provide the above inventive advantage. Moreover, a through hole will be more susceptible to occlusion, contamination, and would also add to the complexity of manufacture of the lip.

As opposed to double lip flat cups known in the art, the claimed invention does not require double lips. Moreover, an outer portion of the engagement area of the claimed suction cup can be divided into one or more sectional areas, thereby limiting the overall vacuum loss on loss of one or two sections.

In contrast to the suction cups disclosed in U.S. Pat. No. 9,682,485 B2, the claimed cup only exhibits one sealing area. In contrast to the suction cups of U.S. Pat. No. 9,682,485 B2, the claimed cup allows for drawing air from the whole engagement area upon actuation of the cup, thereby allowing for potentially regaining of vacuum, if lost from one or more sectional areas.

In order for the inventive cup to be able to be placed at random overlapping an edge of an object to be lifted, the engagement area of the cup should preferably be fully divided into sectional areas, such as e.g. into 6 sectional areas as shown in FIG. 3.

The lip of the inventive suction cup may also exhibit raised contact elements 80, such as for improved stability, contact, and/or friction. The elevation of such contact elements should not be as high as that of the raised portions 60.

The cross-sectional area of the flow passage, and thus also of the flow restriction, can be designed in various sizes to suit different applications. A smaller cross-section of the flow passage will generally entail a lower pressure drop in the suction cup. However, a smaller cross-section may lead to decreased performance when handling leaky objects, such as cardboard and the like, which require a greater flow of evacuation through the flow restriction.

While in principle the invention also allows for more than one flow passage 70 being provided in a sectional area, a lower number is generally preferred, such as 1, 2, or 3, especially 1 or 2 flow passages. It is most preferred that merely one flow passage be provided for each sectional area, since it is believed that the flow restriction can be more closely regulated by using merely one flow passage for each sectional area.

The sealing portion 35 may be formed by a sealing raised portion running along the periphery of the lip, or it may be formed by the outer edge of the lip, or by a thickening of the material of the lip towards the outer portion of the lip. It is generally preferred that the sealing portion is a sealing raised portion. For example, a sealing raised portion may allow for some compression or deformation thereof, thereby offering a better sealing ability over e.g. a small protrusion located on the lifting surface of an object. The sealing raised portion should preferably be narrow. For a better resistance to wear, however, it may be preferable to use an alternative embodiment instead of an outer sealing raised portion.

The inventive compressible lip can be used for suction cups of any form, size and material. In a relaxed state of the lip, the lip is inclined from a central upper portion thereof to an outer lower portion thereof. In a relaxed state of the lip, the engagement surface thereof is preferably essentially concave, such as for example as shown in FIG. 6. The inventive lip is flexible, so as to allow for the lip to collapse against a surface of an object to be engaged when brought into contact with said surface of the object, and evacuated through the central opening. By the collapsing of the lip the raised portions of the sectional areas are capable of being brought into contact with the surface of the object to be engaged.

The lip can be made as a separate part, adapted to be attachable to a hollow body and mounting portion, or to a bellows, such as e.g. disclosed in WO 2010/110719 A1, or in EP 3 133 035 A1. Alternatively, the lip can be made integral with the suction cup, or with a bellows for a suction cup.

EXAMPLES

The invention will be disclosed in more detail by means of the following examples.

In the examples, two polyurethane cups CUP1, and CUP2, respectively, with normal friction pattern were used. CUP1 is a conventional cup as shown in FIG. 7, and CUP2 is a cup according to a preferred embodiment of the invention, which exhibits 6 sectional areas such as shown in FIGS. 3-6. The cross-section of each one of the six flow restrictions was 1.287 mm$^2$, which is quite generous to allow for quick evacuation time of the engagement area. Each sectional area of the lip was designed to allow a maximum flow of 12.75 Nl/min at 60 kPa pressure differential. The vacuum level used during testing was 60 kPa.

Example 1

A plate of acrylic with three 6 mm drilled holes in it was used for testing. The three holes were drilled in close proximity to each other. When placed over the three holes CUP1 was found to uphold 14-kPa. When the inventive cup was placed over the three holes, such that all three holes were covered by one and the same sectional area, the cup was found to uphold a pressure of 57-kPa. As opposed to CUP1, when using inventive CUP2, increasing the number of holes covered by one and the same sectional area did not reduce the pressure further, since the flow limit of the sectional area has been reached.

Example 2

In this example, lifting over an edge was tested. A similar plate of acrylic as used in Example 1 was used except for not having any holes in it. When placed over an edge, CUP1 was found to uphold only 7-kPa. Inventive CUP2 was placed over an edge in same way as CUP1, which resulted in two of the six sectional areas being partly exposed to ambient air. Inventive CUP2 was found to uphold 46-kPa with 2 sections of the total 6 sections being partly exposed, such as shown in FIG. 4. In the Example a stretch of the sealing portion corresponding to about one third of the total length of the sealing portion of the lip, was positioned outside the object to be engaged.

Measured results during the testing shows a maximum leakage flow of 14.1 Nl/min per sectional area.

LIST OF REFERENCE NUMERALS USED 10 suction cup
15 hollow mounting portion
20 opening for vacuum
25 hollow body portion
30 compressible lip
35 sealing portion
50 central opening for vacuum
100 object to be engaged or lifted
105 surface of an object 100
A engagement area
60 raised portion
60a inner raised portion
60b radial raised portion
70 flow passage
75 flow restriction
a-f sectional areas
80 raised contact element

The invention claimed is:

1. A compressible lip for a suction cup for engaging and lifting an object, wherein the lip in an upper portion thereof has a central opening to vacuum, the lip extends outwardly to a sealing portion located in a lower portion of the lip defining an engagement area of the lip for engaging and lifting the object,
wherein the engagement area includes at least one sectional area, and each of the at least one sectional area forms part of the engagement area,
wherein the lip exhibits a raised portion running along the at least one sectional area of the engagement area, wherein the at least one sectional area is disposed within the engagement area, said raised portion exhibiting a flow passage to vacuum from the central opening,
wherein the at least one sectional area is defined by the raised portion, or, by the raised portion and part of the sealing portion, and
wherein the flow passage is formed in the raised portion, wherein the flow passage is configured to form together with a surface of the object a flow restriction when the raised portion containing the flow passage by compression of the lip is brought into contact with said surface of the object, wherein the flow passage is configured in the raised portion such that the orientation of the flow restriction formed by the flow passage together with the surface of the engaged object by such compression is parallel with the surface of the object to be engaged;
wherein a first sectional area of the at least one sectional area is configured to form together with the surface of the object a first enclosed volume having the flow passage in the raised portion in fluid communication with central opening to vacuum, and
wherein
another part of the engagement area that is not part of the at least one sectional area, or
a second sectional area of the at least one sectional area, is configured to form together with the surface of the object a second enclosed volume that is separate from the first enclosed volume and in fluid communication with the central opening to vacuum.

2. The compressible lip of claim 1, wherein the raised portion comprises an inner raised portion, and two or more radial raised portions running from the inner raised portion to the sealing portion, said inner raised portion, said two or more radial raised portions, and the sealing portion together defining one or more of the at least one sectional areas, wherein the inner raised portion of each one of the sectional areas is provided with a flow passage to vacuum from the central opening.

3. The compressible lip of claim 2, wherein the inner raised portion runs along an inner portion of the lip along the central opening.

4. The compressible lip of claim 2, wherein the engagement area of the lip is circular.

5. The compressible lip of claim 1, wherein the engagement area of the lip exhibits one or more raised contact elements.

6. The compressible lip of claim 5, wherein the one or more raised contact elements form a friction pattern.

7. The compressible lip of claim 1, wherein each one of the at least one sectional area exhibits only one flow passage.

8. The compressible lip of claim 1, further comprising a bellows which is made integral with the lip.

9. A suction cup for engaging and lifting an object, said cup comprising:
- a hollow mounting portion having an upper end and a lower end;
- a hollow body portion having an upper end and a lower end; and,
- a compressible lip having in an upper portion thereof a central opening to vacuum,
- wherein the hollow body portion in its lower end is sealingly connected to the lip, said lip extending outwardly from the hollow body portion to a sealing portion located in a lower portion of the lip defining an engagement area of the suction cup for engaging and lifting the object,
- wherein the engagement area includes at least one sectional area, and each of the at least one sectional area forms part of the engagement area,
- wherein the upper end of the hollow mounting portion is provided with an opening adapted to be connected to a vacuum source, and the lower end of the hollow mounting portion is sealingly connected to the upper end of the hollow body portion,
- wherein the lip exhibits a raised portion running along at least one sectional area of the engagement area, wherein the at least one sectional area is disposed within the engagement area, said raised portion exhibiting a flow passage to vacuum from the central opening,
- wherein the at least one sectional area is defined by the raised portion, or by the raised portion and part of the sealing portion, and
- wherein the flow passage is formed in the raised portion, wherein the flow passage is configured to form together with a surface of the object to be engaged a flow restriction when the raised portion containing the flow passage by compression of the lip is brought into contact with said surface of the object, wherein the flow passage is configured in the raised portion such that the orientation of the flow restriction formed by the flow passage together with the surface of the engaged object by such compression is parallel with the surface of the object to be engaged;
- wherein a first sectional area of the at least one sectional area is configured to form together with the surface of the object a first enclosed volume having the flow passage in the raised portion in fluid communication with central opening to vacuum, and
- wherein
  - another part of the engagement area that is not part of the at least one sectional area, or
  - a second sectional area of the at least one sectional area,
- is configured to form together with the surface of the object a second enclosed volume that is separate from the first enclosed volume and in fluid communication with the central opening to vacuum.

10. The suction cup of claim 9, wherein the hollow body portion comprises a bellows.

11. The suction cup of claim 9, wherein the raised portion comprises an inner raised portion, and two or more radial raised portions running from the inner raised portion to the sealing portion, said inner raised portion, said two or more radial raised portions, and the sealing portion together defining one or more of the at least one sectional area, wherein the inner raised portion of each one of the sectional areas is provided with a flow passage to vacuum from the central opening.

12. The suction cup of claim 11, wherein the inner raised portion runs along an inner portion of the lip along the central opening.

13. The suction cup of claim 9, wherein the engagement area of the lip exhibits raised contact elements.

14. The suction cup of claim 9, wherein the engagement area of the lip of the suction cup is circular.

15. The suction cup of claim 9, wherein each one of the at least one sectional area exhibits only one flow passage.

* * * * *